Aug. 8, 1950  F. F. WERTH  2,518,105
POWER SHOVEL AND FORK ATTACHMENT FOR TRACTORS
Filed Dec. 23, 1946   2 Sheets-Sheet 1
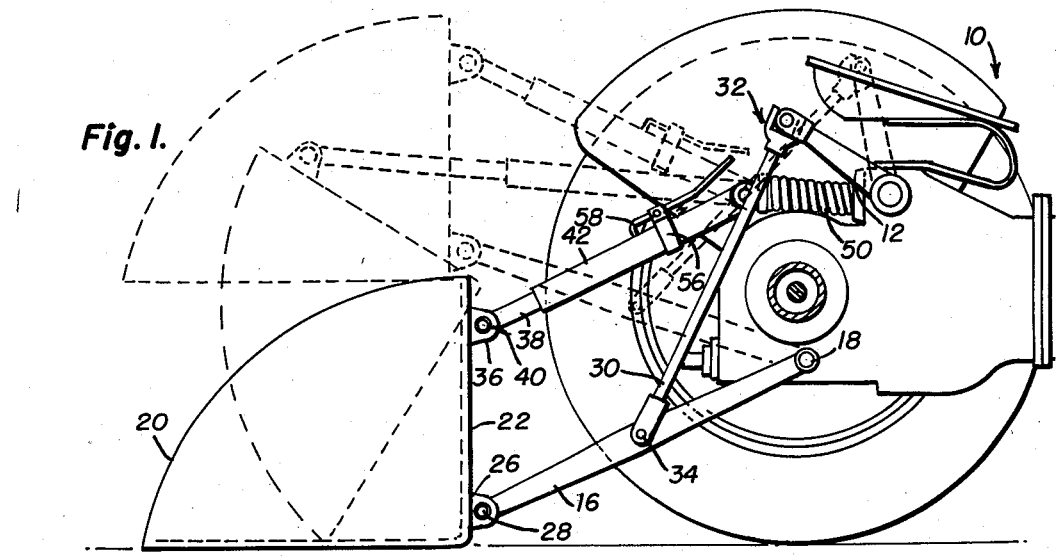
Fig. I.
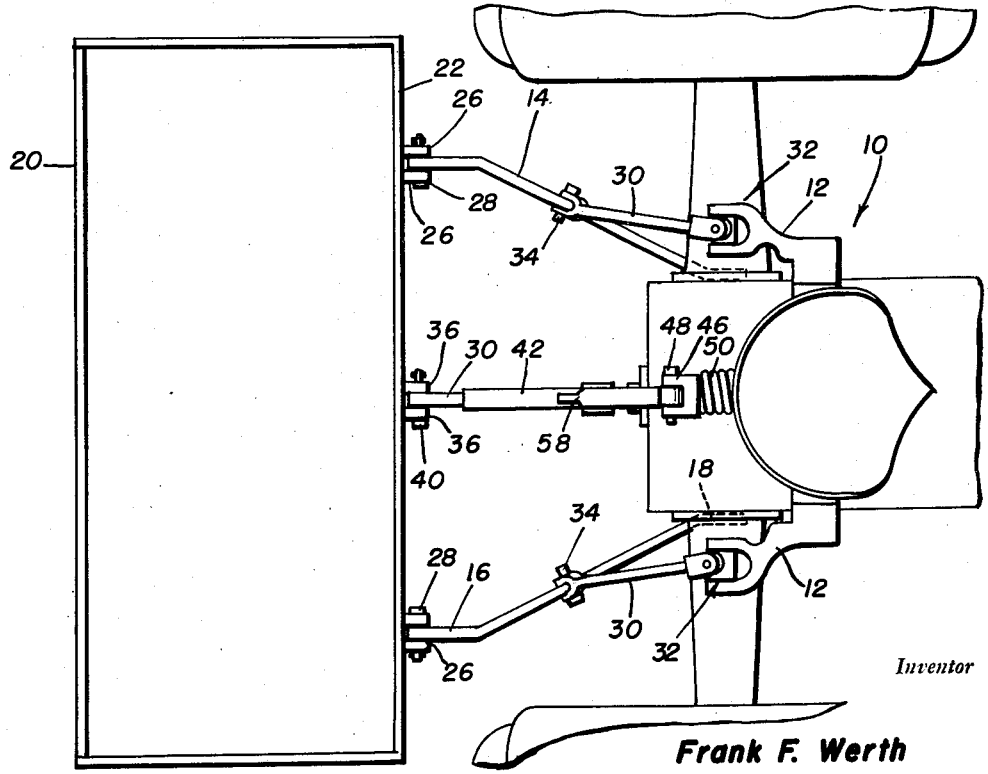
Fig. 2.
Inventor
Frank F. Werth
By Clarence A. O'Brien
and Harvey B. Jacobson
Attorneys Aug. 8, 1950  F. F. WERTH  2,518,105
POWER SHOVEL AND FORK ATTACHMENT FOR TRACTORS
Filed Dec. 23, 1946  2 Sheets-Sheet 2

Inventor
Frank F. Werth

By Clarence A. O'Brien
and Harvey B. Jacobson
Attorneys

Patented Aug. 8, 1950

2,518,105

UNITED STATES PATENT OFFICE 2,518,105

POWER SHOVEL AND FORK ATTACHMENT FOR TRACTORS

Frank F. Werth, Markesan, Wis.

Application December 23, 1946, Serial No. 717,902

4 Claims. (Cl. 214—140)

1

This invention relates to improvements in scoops for tractors and the linkages used in conjunction therewith.

An object of this invention is to provide improved means for levelling surfaces or shovelling quantities of material.

Another object of this invention is to provide means for pivotally lifting and lowering a tractor scoop.

Another object of this invention is to provide extensible means for regulating the travel of the said scoop.

A further object of this invention is to provide improved latching means to be used in cooperation with said extensible means.

Further objects and features of novelty shall be pointed out specifically or will become readily apparent to those skilled in the art, in following the description of the preferred embodiment of the instant invention, illustrated in the accompanying drawings, wherein:

Figure 1 is a side elevational view of a portion of a conventional tractor showing the invention connected thereto;

Figure 2 is a plan view of the invention shown in Figure 1;

Referring now in detail to the above described illustrations of the present invention, like reference characters are used throughout to indicate similar elements.

Figure 3:
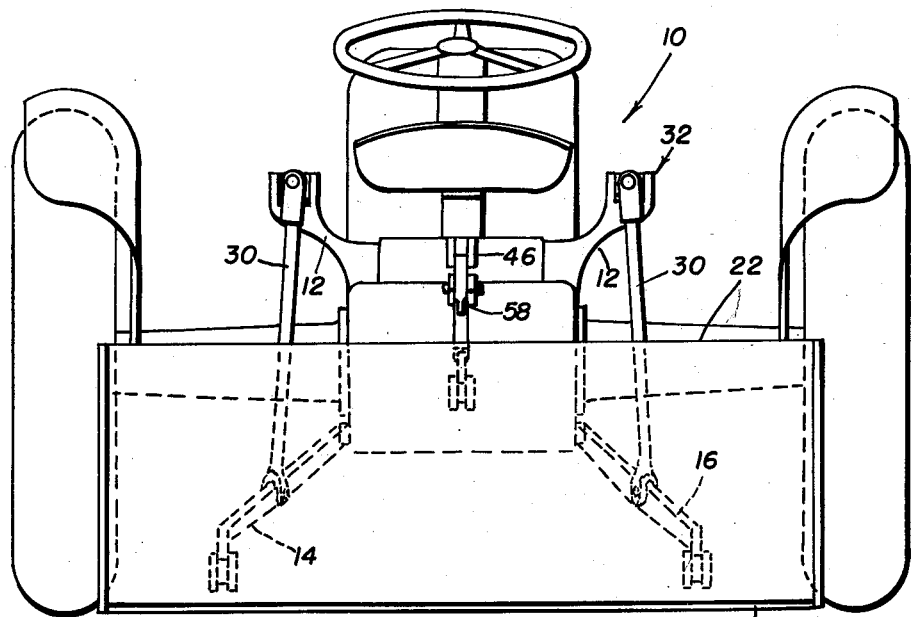
Figure 3 is a back view of the invention shown in Figures 1 and 2.

A tractor generally indicated by the numeral 10 is shown with the conventional hydraulic actuating mechanism links 12 secured thereto. A pair of connecting rods 14 and 16 are pivotally received on an appropriate portion of the tractor structure as at 18. A shovel 20 having a back plate 22 is pivotally received at the terminal portions of said links 14 and 16. The preferred pivot means comprises adjacent each end thereof, a pair of lugs 26 receiving the said arm or tie rod 14 therebetween held in pivoted relation therewith by means of a removable pivot pin 28. A tie rod 30 having a universal joint connection 32 at one end thereof and having a pivoted connection 34 at the other end thereof, is operatively secured to the actuating rod 12 and the said connecting rods.

The operation of this portion of the invention is deemed quite apparent. Upon actuation of the conventional hydraulic system within the tractor, the actuating rods or links 12 are moved arcuately thereby lifting or depressing the tie rod 30. As the said tie rods 30 are moved the connecting rods 14 and 16 are selectively depressed and lifted thereby imparting an arcuate travel to the said shovel 20.

Secured or formed integral with the back plate 22 is a pair of lugs 36 similar to the hereinabove described lugs 26. The said lugs 36 are formed on the transverse centerline of said back plate and are adjacent the top edge thereof. A link 38 is pivoted at one end thereof to said lugs by suitable pivot pin 40 which is similar to the described pin 28. A sleeve 42 having a suitable aperture 44 in one end thereof, is adapted to receive the said link 38 in the bore thereof. The end of the said sleeve 42 is suitably pivoted to a perch 46 through the medium of a pivot pin 48 extending through the said perch and the said aperture 44. A conventional control spring 50 is received behind said perch 46 to perform its well known conventional function.

Figure 4:
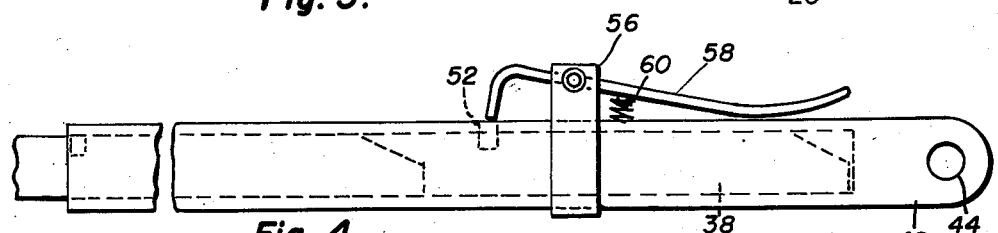
Figure 4 is an enlarged fragmentary detail of the extensible link forming part of the instant invention.
Figure 5:
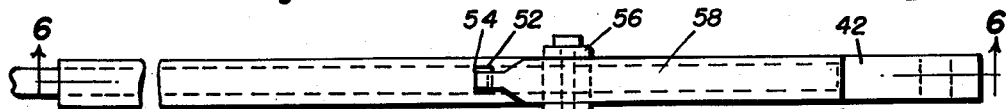
Figure 5 is a plan view of the link shown in Figure 4.
Figure 6:
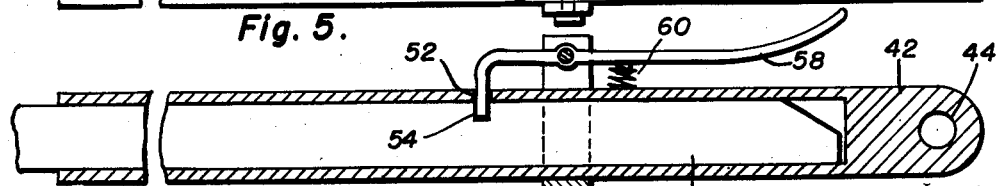
Figure 6 is a longitudinal sectional view of the extensible link shown in Figure 5 and taken substantially on the line 6—6 thereof and in the direction of the arrows.

An aperture 52 is provided in the said sleeve 42 and a suitable slot 54 is formed in the said link 38. A suitable band 56 having a right angular latch keeper 58 pivoted thereto, is fixedly received on the sleeve 42. A suitable spring biasing means, preferably a coil spring as shown in Figures 4 and 6, is provided between the said latch keeper 58 and sleeve 42. This spring biasing means 60 constantly urges the said latch keeper 58 through the aperture 52 and into the slot 54.

The operation of this portion of the invention is as follows. While the shovel is being used to level the ground or pick up fertilizer, snow or other material, the extensible link 38, 42 is held rigid through the action of the latch keeper 58 and its associated parts. This construction will render the shovel 20 stationary relative to the tractor. When the shovel 20 is lifted to its dump position the latch keeper 58 is depressed against the action of the resiliently biasing means 60 thereby releasing the associated latch. The link 38 is then free to slide in the bore of the said sleeve 42. When the shovel is lifted to its upper position the spring biased latch means is permitted to lock the arm 38 and sleeve 42 in fixed relation thereby holding the said shovel in the said raised position. An inspection of Figure 1 discloses the above discussed three positions of the said shovel 20.

Due to the mechanical simplicity characterizing this invention, a further description thereof is deemed unnecessary. It is understood, however, that various changes as to size and shape, omissions and additions, may be made herein without departing from the spirit of the invention. Accordingly, limitation is sought only in accordance with the accompanying claims.

Having thus described my invention what is claimed as new and novel is:

1. For use with a tractor having pivoted lift arms, a hydraulic actuation mechanism associated therewith and a control spring apparatus connected with the hydraulic actuation mechanism, the improvement which comprises: a shovel having a back plate, connecting rods pivoted to said back plate and the tractor, pitman rods pivoted to each of said connecting rods at points spaced from each end of the connecting rods, universal joints connecting the opposite ends of the pitman rods and said lift arms, a sleeve pivotally associated with the control spring apparatus, a link pivoted to said back plate and slidably received in the bore of said sleeve, said sleeve having an aperture therein, and a latch keeper pivotally secured to said sleeve having a bent terminal projecting through said aperture.

2. The combination of claim 1 and said link having a notch seating said bent terminal, a spring seated on said sleeve and reacting on said latch keeper constantly biasing said bent portion through said aperture and in said notch.

3. The combination of claim 2 and a cam surface on the end of said link which is received in said sleeve to engage and lift said vent portion when said link is inserted in said sleeve.

4. The combination of claim 1 and a notch in said link seating said bent terminal, a cam surface on the end of said link to permit the bent terminal to ride thereover when said link is inserted in said sleeve.

FRANK F. WERTH.

REFERENCES CITED

The following references are of record in the file of this patent:

UNITED STATES PATENTS

| Number | Name | Date |
| --- | --- | --- |
| 2,311,671 | Larsen | Feb. 23, 1943 |
| 2,326,197 | Blecha | Aug. 10, 1943 |
| 2,330,847 | Seal | Oct. 5, 1943 |
| 2,350,327 | Ender | June 6, 1944 |
| 2,397,046 | Richey | Mar. 19, 1946 |
| 2,398,585 | Hayward | Apr. 16, 1946 |
| 2,427,575 | Sedore | Sept. 16, 1947 |